Dec. 17, 1963
W. WERNER ET AL  
METHOD OF OPERATING TWO-STROKE  
INTERNAL COMBUSTION ENGINES  
Filed April 21, 1960
3,114,356
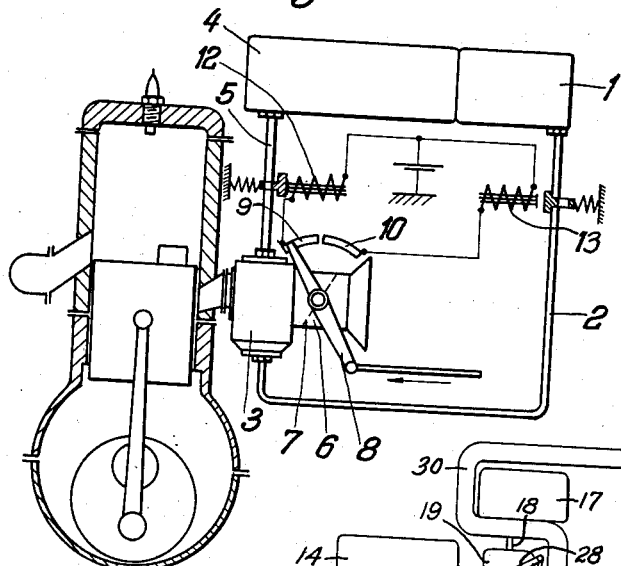
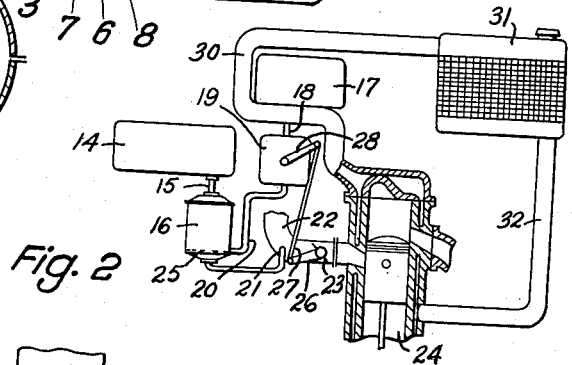
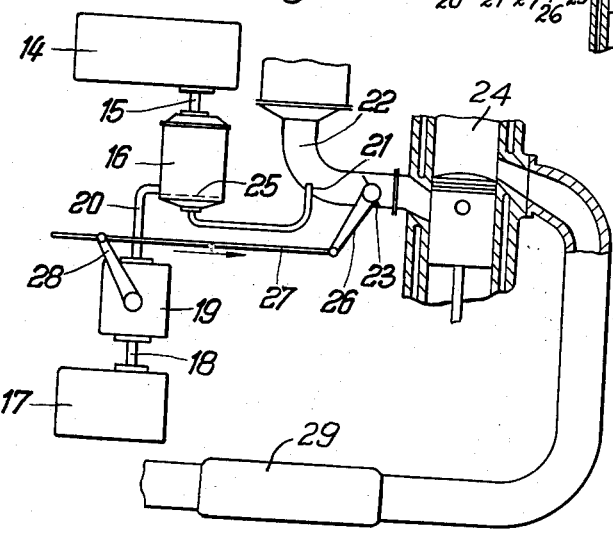
Inventors:  
W. Werner, O. Siebler, E. Alt and B. Büchner  
BY Richards & Geier  
ATTORNEYS

United States Patent Office 3,114,356
Patented Dec. 17, 1963

3,114,356
METHOD OF OPERATING TWO-STROKE
INTERNAL COMBUSTION ENGINES
William Werner and Oskar Siebler, Dusseldorf-Kaiserwerth, and Ernst Alt and Bernhard Büchner, Ingolstadt, Germany, assignors to Auto Union G.m.b.H., Ingolstadt, Germany
Filed Apr. 21, 1960, Ser. No. 23,809
Claims priority, application Germany Apr. 30, 1959
7 Claims. (Cl. 123—73)

The present invention relates to a method of operating two-stroke internal combustion engines with oil-in-gasoline or fuel-oil mixture lubrication. It is usual practice to lubricate, for example three-cylinder automobile engines, with a mixture of oil and fuel in the ratio of 1:40. Engines of this type are simple in operation and are capable of delivering high continuous outputs. However, they also present the disadvantage of developing exhaust smoke in the lower speed range, because the excess oil delivered to the engine passes into the exhaust system.

It is also known to provide two-stroke internal combustion engines which comprise a crankcase scavenging and charging pump and in which the supply of lubricant is regulated in dependence on the speed and loading of the engine, with a lubricating pump which draws lubricant through suction pipes from a lubricant reservoir and delivers it through pressure pipes into the induction pipe or manifold where it is taken along by the induction air. With this arrangement there is the disadvantage that under cold weather conditions the viscous oil is not mixed quickly enough with the fuel, so that the engine may sustain damages due to lack of lubricating oil. This condition is also not improved when in a practically closed lubricating circuit comprising a lubricant reservoir, a suction conduit, a lubricating pump, a pressure conduit and a return conduit contiguous to the latter and leading back into the lubricant reservoir, there is provided at the point of transition from the pressure conduit to the return conduit, a control means which is coupled with the output regulating means of the engine, and directs that part of the lubricant delivered by the pump, which is required for lubricating the engine, into the conduit leading to the induction pipe of the engine.

Finally, there is known a method of lubricating port-controlled two-stroke internal combustion engines comprising a crankcase charging pump, in which lubricating oil and fuel are supplied together, a low mixture ratio being used when the engine is warm, and a high mixture ratio being used when the engine is cold. The characteristic feature of this method resides in the fact that a mixture of lubricating oil and fuel in the ratio of about 1:25 is supplied to the engine which ratio, as the engine warms up, is automatically reduced to about 1:40 in dependence on the engine temperature, by adding pure fuel. Even though this type of lubrication presents the advantage that it absolutely prevents any damage to the cold engine due to lack of lubricant, it also has the drawback that large quantities of oil accumulate in the exhaust system, causing post-combustion of the oil in the exhaust with the corresponding generation of exhaust smoke. It is an object of the present invention to obviate this drawback without causing other deficiencies.

The present invention solves this problem by employing a new method of operating two-stroke internal combustion engines, according to one of the embodiments of which the mixture ratio of oil to fuel is progressively regulated from 1 to ∞ under idling conditions, to the usual ratio at full load. It should be noted in this connection that at full load there is no detrimental accumulation of oil at a ratio of 1:40 or 1:50. Thereby the accumulation of excess oil in the exhaust system under idling and part-load operating conditions is lessened and the exhaust fuming resulting therefrom is diminished. The amount of oil contained in the crankcase is sufficient for the lubrication in the lower part-load range.

According to another embodiment of the present invention, there are provided a reservoir containing fuel and a reservoir containing a fuel/oil mixture, each of these reservoirs being connected by a conduit with the carburetor, and means which are operatively connected with the throttle member and which at slight throttle openings open a valve for fuel, and at wider throttle openings open a valve for the supply of fuel/oil mixture. In this manner, fuel can be mixed with oil in three different ratios, so that the regulation of the correct fuel/oil mixture ratio is assured under all operating conditions with simple and inexpensive means. There is also the further advantage that the speed of response with which the lubricant supply changes, is variable with the amount of liquid contained in the carburetor, respectively in the carburetor float chamber.

Particularly suitable for the purposes of the present invention are contact-making means provided on the throttle member, which operate electrically controlled valves in the connecting lines between the carburetor and the fuel reservoirs.

If it is desired to fill the fuel tank with fuel only, and the oil is to be filled in separately, as is general practice with four-stroke engines, it is of advantage to supply oil from a pump in the fuel line or to the carburetor float chamber, in dependence on the position of the throttle member. The mixture ratio may also be influenced, in such a manner that less oil is supplied to the carburetor when the exhaust pipe is cold than when it is hot. The exhaust pipe is particularly suitable for the mounting of a thermocouple because its temperature is most rapidly influenced by any changes in engine load, and because it contributes most to the generation of exhaust smoke.

Further details of the present invention will become apparent from the following description when taken in conjunction with the accompanying drawing in which two embodiments are shown by way of example only.

In the drawings:

FIG. 1 shows schematically a device for regulating the mixture in three different ratios, which comprises two separate fuel reservoirs, and FIG. 2 is a diagrammatic view of a device for progressively regulating the mixture ratio, which comprises a fuel reservoir and an oil reservoir.

FIG. 3 illustrates a somewhat different embodiment.

Referring now more particularly to the device illustrated in FIG. 1, it may be seen that a conduit 2 leads from the fuel reservoir 1 to the carburetor float chamber 3. From the reservoir 4 which contains a fuel/oil mixture, a conduit 5 leads also to the carburetor float chamber 3. In the induction pipe 6, a throttle valve 7 with a two-armed lever 8 is pivotally mounted. The lever 8 carries on its free end a contact member which first slides on a segment 9 and then, when the accelerator pedal is further depressed, slides on a segment 10 which is insulated from segment 9. The contact member on lever 8 is connected to ground. The segment 9 controls an electromagnetically operated valve 12, whereas the segment 10 is connected with an electromagnetically operable valve 13. As long as the contact member on lever 8 slides on segment 9, fuel is supplied to the float chamber 3 through conduit 2. This is accomplished through the provision of springs (not shown) which normally maintain the valves 12 and 13 in their open positions. On the other hand, the flow of an electrical current through a valve will exert pressure opposed to that of the spring and will close that valve. In the position shown in FIG. 1 the lever 8 is over the contact 9, so that the valve 12 is supplied with electrical current and thus is closed. On the other hand, since no current flows through the valve 13, the valve 13 is open thereby providing flow of fuel from the reservoir 1 and through the conduit 2 into the float chamber 3. When the lever 8 is moved over the segment 10, the flow of electrical current to the valve 12 is interrupted, so that the valve 12 is opened by its spring. On the other hand, the valve 13 is then supplied with electrical current and will be closed. Fuel-oil mixture will then flow from the reservoir 4 and through the conduit 5 into the float chamber 3.

Thus through the use of valves 12 and 13 the fuel can be mixed with oil in three different ratios before it is supplied to the float chamber 3. In the position illustrated in FIG. 1, current flows through the valve 12 and keeps the valve 12 closed, while there is no current in the valve 13 and the valve 13 is open, so that pure fuel flows from the reservoir 1 to the float chamber 3. In other words, the ratio of the fuel oil mixture is then $1:\infty$. When the lever 8 is moved into a position between the contact 9 and the contact 10, then there is no current flowing through either the valve 12 or the valve 13 and, consequently, both valves are open. Then pure fuel will flow out of the reservoir 1 into the float chamber 3, and also a fuel-oil mixture will flow at the same time out of the reservoir 4 into the float chamber 3. The fuel-oil mixture in the reservoir 4 may have, for example, the ratio 1:50. In the float chamber 3 the mixture ratio will be then richer in oil than the mixture $1:\infty$ but will be poorer in oil than the fuel-oil mixture in the reservoir 4. When the lever 8 is now moved still further, so that it is over the contact 10, the valve 13 will be supplied with electrical current and will be closed, while the valve 12 will remain open. In this position only the fuel-oil mixture from the reservoir 4 will flow into the float chamber 3.

It is thus apparent that the device of FIGURE 1 provides a three-step regulation, whereby fuel is supplied from the reservoir 1 during idling or partial load, while fuel-oil mixture is supplied from the reservoir 4 during full load.

In the embodiment shown in FIG. 2, fuel from a reservoir 14 is supplied to the carburetor float chamber 16 through a conduit 15. At the same time, oil from an oil reservoir 17 can be quickly heated by the exhaust pipe 29 leading from the engine cylinder 24. Thus the oil, on the one hand, will always remain thin, and on the other hand will not be subjected to great differences in temperature; oil is drawn through a conduit 18 by a variable-output pump 19, and delivered by this pump through a conduit 20 into the float chamber 16. From the float chamber 16, the mixture of oil and fuel passes in the usual way through a nozzle 21 and an induction pipe 22 into the engine cylinder 24, in dependence on the position of throttle valve 23. The carburetor float chamber 16 contains a perforated plate 25, so that the oil from conduit 20 will be brought into contact with the fuel with the greatest possible surface area, and will be intimately mixed therewith in the float chamber. Oil which has a much greater viscosity than fuel will adhere as a thin layer to the large outer surfaces of the perforated plate. Drops of oil which are produced when pressure is changed quickly or during cold starting, provide a large surface at the perforated plate so that they mix quickly with the fuel current. Thus a uniform thorough distribution of oil in the fuel continues to take place even under unusual operating conditions. The lever 26 on the throttle valve 23 is connected by a rod 27 with the control lever 28 of the oil pump 19. In this manner, only a small amount of oil is delivered by pump 19 to float chamber 16 when the throttle valve 23 is only slightly opened, whereas more oil is supplied to the float chamber 16 when the throttle valve 23 is in the fully open position.

FIG. 3 shows a construction which is substantially similar to that of FIG. 2. However, in the construction of FIG. 3 the bottom of the oil reservoir 17 is in contact with a pipe 30 transmitting cooling water and connected with a cooler 31. The cooler 31 is connected by a pipe 32 with the engine cylinder 24.

We claim:

1. An apparatus for lubricating the drive of internal combustion engines, particularly two-stroke internal combustion engines, said apparatus comprising in combination with an engine cylinder, an induction pipe connected to said engine cylinder, a throttle valve in said induction pipe, means forming a carburetor float chamber and a nozzle connecting said carburetor float chamber with said induction pipe; a fuel reservoir connected with the carburetor float chamber, an oil reservoir, a pump connected with said oil reservoir, a conduit connected with said pump and connected with said carburetor float chamber adjacent said nozzle, a control lever connected with said pump for regulating the supply of oil from said pump to the carburetor float chamber, and means operatively connected with said throttle valve and said control lever for varying said supply of oil depending upon the position of said throttle valve.

2. A method of lubricating two-stroke internal combustion engines, comprising the steps of mixing fuel solely with oil prior to its entry into the engine induction pipe, and regulating the mixture ratio of oil to fuel depending on throttle setting from 1 to $\infty$ under idling throttle setting to the usual ratio of about 1:40 to 1:60 at fully opened throttle.

3. An apparatus for lubricating a two-stroke cycle internal combustion engine comprising an induction pipe connected to said engine, a carburetor connected to the engine induction pipe, a reservoir containing fuel, a reservoir containing a fuel-oil mixture, a separate conduit connecting each of said reservoirs with the carburetor, a separate valve in each conduit, a throttle member in the induction pipe, and means which are operatively connected with the throttle member and are movable from slight throttle openings to wider throttle openings, said means at slight throttle openings maintaining open the valve for the supply of fuel and at wider throttle openings maintaining open the valve for the supply of fuel-oil mixture.

4. An apparatus in accordance with claim 3, further comprising contact-making means provided on the throttle member, and electrical control means for operating said valves in the conduits connecting said carburetor and said reservoirs, said contact-making means operating said electrical control means of the valves.

5. An apparatus for lubricating a two-stroke cycle internal combustion engine comprising an induction pipe connected to said engine, a carburetor adapted to be connected to the engine induction pipe, a float chamber in said carburetor, a reservoir containing fuel, a reservoir containing oil, a separate conduit connecting each of said reservoirs with the carburetor, a pump connected to the oil reservoir and carburetor for delivering oil to the float chamber, a throttle member, and means operatively connected to the throttle member and the pump, said means at slight throttle openings permitting only a small amount of oil to be delivered by the pump, whereby at open throttle position more oil is supplied to the float chamber.

6. An apparatus in accordance with claim 5, further comprising a perforated plate located in said carburetor float chamber.

7. An apparatus for lubricating a two-stroke cycle water cooled internal combustion engine comprising an induction pipe connected to said engine, a carburetor adapted to be connected to the engine induction pipe, a float chamber in said carburetor, a reservoir containing fuel, a reservoir containing oil, means adapted to circulate engine cooling water around said oil reservoir, a separate conduit connecting each of said reservoirs with the carburetor, a pump connected to the oil reservoir and carburetor for delivering oil to the float chamber, a throttle member, and means operatively connected to the throttle member and the pump, said means at slight throttle openings permitting only a small amount of oil to be delivered by the pump, whereby at open throttle position more oil is supplied to the float chamber.

References Cited in the file of this patent
UNITED STATES PATENTS

| 1,087,387 | Lemp | Feb. 17, 1914 |

FOREIGN PATENTS

| 644,933 | Germany | May 18, 1937 |
| 678,269 | Germany | July 12, 1939 |
| 375,932 | Italy | Oct. 26, 1939 |